US012119197B2

(12) United States Patent
Vasilev et al.
(10) Patent No.: US 12,119,197 B2
(45) Date of Patent: Oct. 15, 2024

(54) ON-LOAD TAP CHANGER WITH POSITIONING DEVICE AND METHOD FOR ASSEMBLING AN ON-LOAD TAP CHANGER

(71) Applicant: HITACHI ENERGY LTD, Zürich (CH)

(72) Inventors: Borislav Vasilev, Sofia (BG); Todor Kokev, Sofia (BG); Angel Mihaylov, Plovdiv (BG); Tommy Larsson, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/560,711

(22) PCT Filed: Jul. 21, 2022

(86) PCT No.: PCT/EP2022/070486
§ 371 (c)(1),
(2) Date: Nov. 14, 2023

(87) PCT Pub. No.: WO2023/001962
PCT Pub. Date: Jan. 26, 2023

(65) Prior Publication Data

US 2024/0249893 A1 Jul. 25, 2024

(30) Foreign Application Priority Data

Jul. 23, 2021 (EP) .................................... 21187497

(51) Int. Cl.
*H01H 9/00* (2006.01)
*H01H 11/00* (2006.01)

(52) U.S. Cl.
CPC .......... *H01H 9/0044* (2013.01); *H01H 11/00* (2013.01)

(58) Field of Classification Search
CPC .. H01H 9/0044; H01H 9/0005; H01H 9/0011; H01H 9/0016; H01H 9/0027;
(Continued)

(56) References Cited

U.S. PATENT DOCUMENTS 3,167,703 A 1/1965 Schindler
5,191,179 A * 3/1993 Yatchum ............. H01H 9/0027 200/18

(Continued)

FOREIGN PATENT DOCUMENTS

CN 108475591 A 8/2018
CN 109065383 A 12/2018

(Continued)

OTHER PUBLICATIONS

International Search Report and Written Opinion of the International Searching Authority, PCT/EP2022/070486, mailed Oct. 27, 2022, 14 pages.

(Continued)

*Primary Examiner* — William A Bolton
(74) *Attorney, Agent, or Firm* — Sage Patent Group

(57) ABSTRACT

An on-load tap changer includes a static unit including fixed contacts for connection to taps at a transformer winding, a dynamic unit including at least one movable contact for selectively contacting one of the fixed contacts during operation of the transformer, and includes a rotational positioning device for adjusting the rotational position of the dynamic unit relative to the static unit during at least one of assembly or disassembly of the tap changer.

11 Claims, 4 Drawing Sheets

(58) Field of Classification Search
CPC .. H01H 9/0033; H01H 9/0038; H01H 9/0072; H01H 9/00; H01H 11/00
USPC ............................................ 200/52 R, 11 TC
See application file for complete search history.

(56) References Cited

U.S. PATENT DOCUMENTS

| | | | | |
|---|---|---|---|---|
| 9,343,244 | B2 * | 5/2016 | Ishikawa .............. | H01H 9/0027 |
| 9,640,341 | B2 * | 5/2017 | Hoepfl ................. | H01H 9/0044 |
| 9,697,963 | B2 * | 7/2017 | Zwirglmaier ........ | H01H 9/0033 |
| 10,418,196 | B2 * | 9/2019 | Larrieta Zubia ..... | H01H 9/0016 |
| 2015/0170847 | A1 * | 6/2015 | Wrede .................. | H01H 3/3042 200/11 TC |
| 2015/0303006 | A1 * | 10/2015 | Bieringer ............. | H01H 9/0011 200/11 TC |
| 2017/0271098 | A1 * | 9/2017 | Pankofer ................. | H01F 29/04 |
| 2020/0411254 | A1 * | 12/2020 | Hammer .............. | H01H 9/0038 |

FOREIGN PATENT DOCUMENTS

| | | | |
|---|---|---|---|
| CN | 110603619 | A | 12/2019 |
| DE | 1039129 | B | 9/1958 |
| KR | 20080114698 | A | 12/2008 |
| KR | 1020230048567 | A | 4/2023 |
| KR | 1020230080503 | A | 6/2023 |
| KR | 1020230128396 | A | 9/2023 |
| WO | 2018148812 | A1 | 8/2018 |

OTHER PUBLICATIONS

Korean Office Action English Translation, Korean Patent Application No. 10-2023-7028455, mailed Jan. 17, 2024, 12 pages.
Chinese Notice of Allowance and English Summary, Chinese Application No. 202280051696.3, mailed Jun. 14, 2024, 7 pages.
Korean Decision for Grant of Patent and English Translation, Korean Patent Application No. 10-2023-7028455, mailed Jul. 29, 2024, 6 pages.

* cited by examiner

ON-LOAD TAP CHANGER WITH POSITIONING DEVICE AND METHOD FOR ASSEMBLING AN ON-LOAD TAP CHANGER

CROSS REFERENCE TO RELATED APPLICATIONS

This application is a 35 U.S.C. § 371 national stage application of PCT International PCT/EP2022/070486 filed on Jul. 21, 2022, which claims priority to European Patent Application 21187497.9, filed on Jul. 23, 2021, the disclosures and content of which are incorporated by reference herein in their entireties.

TECHNICAL FIELD

The present disclosure relates to an on-load tap changer.

BACKGROUND

On-load tap changers enable changing turn ratios of a transformer during operation without interrupting a power supply of the transformer.

Such a tap changer comprises at least one set of fixed contacts which are connectable to a number of taps of a winding of a transformer, wherein the taps are located at different positions at the transformer winding. At least one moveable contact of the tap changer is selectively connectable to one of the fixed contacts. By changing the position of the moveable contact and, thereby, the electrical connection to one of the fixed contacts during operation, the effective number of turns of the transformer can be increased or decreased, thus regulating the output voltage of the transformer.

During a tap change, a new tap can be physically connected before the old tap is disconnected. In order to avoid high circulating currents between the new and the old tap, the tap changer comprises a switching device, referred to as a diverter switch, in addition to a tap selector. The tap selector is used to select a tap, wherein the diverter switch performs a commutation of the load currents from the old tap to the new tap.

Document EP 3 024 007 A1 discloses an on-load tap changer comprising a tap selector and a diverter switch. Document WO 2018/148812 A1 discloses a spring-energy accumulator for a power diverter switch of an on-load tap changer. U.S. Pat. No. 3,167,703 A discloses an on-load tap changer comprising a rotatably mounted shaft carrying a movable contact assembly. A calibration of the apparatus is enabled by an operating shaft being adjustably secured in any of a plurality of angular positions relative to the tap changer shaft. DE 10 39 129 B discloses a tap changer comprising a device enabling varying the number and size of steps for tap changing. CN 109 065 383 A discloses an off-load tap changer comprising a positioning bolt which can be fixed to a selected one of slots for setting a rotational portion of a screw rod.

The movable contacts may be part of a unit, referred to as dynamic unit in the following. The static contacts may be part of a further unit, referred to as static unit in the following. The static unit may comprise a cylindrical housing in which the dynamic unit is lowered during assembly and from which the dynamic unit is lifted out during disassembly. Such tap changers are also known as column-type tap changers.

During assembly and disassembly, a risk of mechanical damage of the movable and fixed contacts due to unwanted mechanical interactions of the contacts exists.

SUMMARY

Embodiments of the disclosure relate to an improved on-load tap changer. Further embodiments of the disclosure relate to a method for assembling and disassembling an on-load tap changer.

According to a first aspect of the disclosure, an on-load tap changer comprises a static unit comprising fixed contacts for connection to taps at a transformer winding and comprises at least one movable contact for selectively contacting one of the fixed contacts during operation of the transformer. The tap changer may comprise several sets of fixed contacts and movable contacts for every phase. The sets of contacts may be located one above the other. Furthermore, the tap changer may comprise two movable contacts for each phase. One of the movable contacts may be referred to as an "even" movable contact and the second one of the movable contacts may be referred to as an "odd" movable contact. The two movable contacts enable a tap change during operation, wherein power is switched by a diverter switch from one of the movable contacts to the other one of the movable contacts.

The static unit may comprise a container, such as a cylindrical container. The dynamic unit may be configured to be lowered into the container for assembly and lifted out of the container for disassembly.

The on-load tap changer comprises a rotational positioning device for adjusting the rotational position of the dynamic unit relative to the static unit during at least one of assembly or disassembly of the tap changer. By adjusting the relative rotational position of the units, the relative rotational positions of the movable and fixed contacts can be adjusted. This can ensure that the movable contacts are disengaged from the fixed contacts in the assembly or disassembly process. Thereby, mechanical damage of the contacts during assembly or disassembly can be prevented.

The tap changer may be configured such that the dynamic unit is axially positioned within the static unit until the final axial position is reached, without that a mechanical interaction of the movable and fixed contacts occur. After that, the rotational position of the dynamic unit can be adjusted to bring the movable contacts in engagement with the fixed contacts. For disassembling the tap changer, the rotational position of the dynamic unit may be adjusted to disengage the movable contacts from the fixed contacts. After that, the dynamic unit can be axially displaced and, thereby, lifted out of the static unit.

The rotational positioning device comprises an interaction of first and second teeth of the dynamic and static unit. The interaction of teeth may form a spur gear mechanism. As an example, the rotational positioning device may comprise an interaction of a top plate of the dynamic unit with a part of the static unit. The top plate may carry an energy accumulating device for coordinating and driving operations during a tap change. As an example, the top plate may comprise first teeth formed at an edge of the top plate. The second teeth may be formed by a spur wheel of the static unit, for example.

The rotational positioning device comprises an adjustment member operable by a user for actuating the rotational positioning device. The adjustment member may comprise a bolt. The bolt may be in splined connection with a spur wheel of the rotational positioning device.

The rotational positioning device comprises a first stop position in which further rotational adjustment in one rotational direction is prevented. As an example, for assembly, the rotational position of the dynamic unit is adjusted until the first stop position is reached. The stop position may indicate that the movable contacts are fully engaged with the fixed contacts and a final assembled state is reached. For disassembly, the rotational position of the dynamic unit may be adjusted in a different direction until a second stop position is reached. The second stop position may indicate that the movable contacts are fully disengaged from the fixed contacts and that an axial movement of the dynamic unit can be carried out.

The on-load tap changer may further comprise an axial blocking device preventing at least one of assembling and disassembling the dynamic unit and the static unit unless the dynamic unit is in a pre-defined rotational position relative to the static unit. Thereby, axially displacing the dynamic unit and the static unit in a state where the movable contacts are engaged with the fixed contacts can be prevented. As an example, the axial blocking device may comprise a stop member and a stop surface blocking axial movement of the stop member. Furthermore, at least one slot may be provided, wherein at least one of assembly and disassembly is enabled when the stop member is rotationally aligned with the slot.

According to a further aspect of the disclosure, a method for at least one of assembling and disassembling an on-load tap changer comprises the step of adjusting a relative rotational position of a dynamic unit comprising movable contacts and a static unit comprising fixed contacts by actuating a rotational positioning device. The on-load tap changer may comprise any structural and functional features of the on-load tap changer described in the foregoing.

A method of assembling the on-load tap changer may comprise positioning the dynamic unit within the static unit in a final axial position and, after that, actuating the rotational positioning device. The rotational positioning device may be actuated until a first stop position is reached, i.e., until the rotational position of the dynamic unit cannot be adjusted further in a rotational direction. The first stop position may be a position in which the movable contacts are fully engaged with the fixed contacts.

A method of disassembling the on-load tap changer may comprise actuating the rotational positioning device and, after that, removing the dynamic unit from the static unit. As an example, the dynamic unit may be lifted out of the static unit. Also here, the rotational positioning device may be actuated until a second stop position is reached. The second stop position may be a position in which the movable contacts are fully disengaged from the fixed contacts.

The present disclosure comprises several aspects and embodiments. Every feature described with respect to one of the aspects and embodiments is also disclosed herein with respect to the other aspects and embodiments, even if the respective feature is not explicitly mentioned in this context.

BRIEF DESCRIPTION OF THE DRAWINGS

Further features, refinements and expediencies become apparent from the following description of the exemplary embodiments in connection with the figures. In the figures, elements of the same structure and/or functionality may be referenced by the same reference signs. It is to be understood that the embodiments shown in the figures are illustrative representations and are not necessarily drawn to scale.

DETAILED DESCRIPTION

Figure 1:
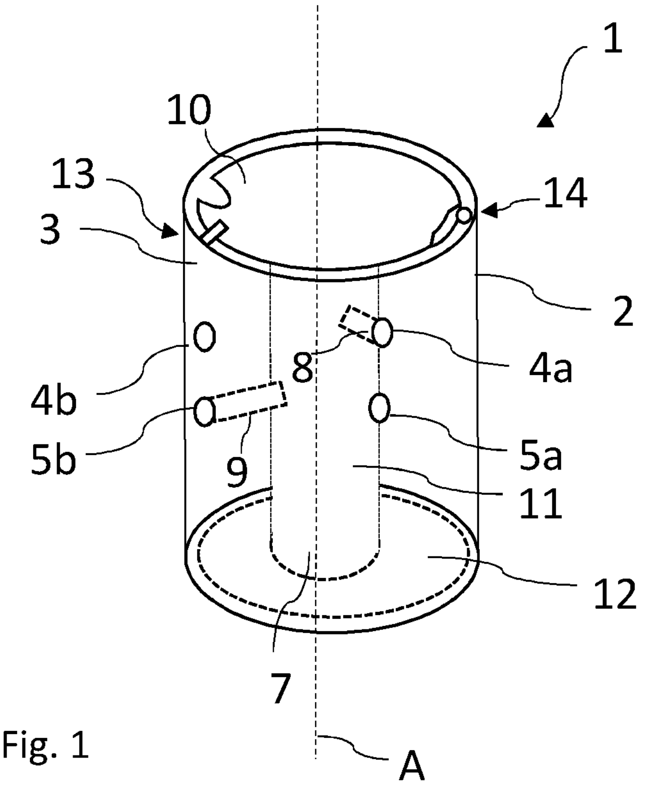
FIG. 1 is a schematic view of an on-load tap changer according to an embodiment.

FIG. 1 shows an on-load tap changer 1 for connection to a transformer. The on-load tap changer 1 enables changing turn ratios of the transformer during operation without interrupting a power supply. The on-load tap changer 1 is configured to be attached to the transformer, either to the transformer wall or to yokes providing a fixation to the transformer.

The on-load tap changer 1 comprises a static unit 2 comprising a cylindrical container 3. The cylindrical container 3 is electrically insulating. The static unit 2 comprises fixed contacts 4*a*, 4*b*, 5*a*, 5*b*. The on-load tap changer 1 further comprises a dynamic unit 7. The dynamic unit 7 comprises movable contacts 8, 9 for connection to selected ones of the fixed contacts 4*a*, 4*b*, 5*a*, 5*b*.

The fixed contacts 4*a*, 4*b*, 5*a*, 5*b* are guided through a wall of the container 3. In the Figure, only the fixed contacts 4*a*, 4*b*, 5*a*, 5*b* are shown. However, a set of fixed contacts 4*a*, 4*b*, 5*a*, 5*b* may be provided for each phase at a different height of the static unit 2. The fixed contacts 4*a*, 4*b* are arranged at different angular positions at the same height of the container 3. The fixed contacts 5*a*, 5*b* are axially shifted relative to the fixed contacts 4*a*, 4*b*. The number of fixed contacts at the same height may be larger as the number of contacts shown in the Figure. The fixed contacts 4*a*, 4*b*, 5*a*, 5*b* are configured to be connected to different taps of the transformer windings. In further embodiments, it is also possible that all fixed contacts 4*a*, 4*b*, 5*a*, 5*b* are positioned at the same height.

The movable contacts 8, 9 comprise an "even" movable contact 8 and an "odd" movable contact 9 for selecting a new tap position without interrupting power supply, wherein power is switched by a diverter switch from one of the movable contacts 8, 9 to the other one of the movable contacts 8, 9. The movable contacts 8, 9 are connected to a holder 10 of the dynamic unit 7. The details of the holder 10 are not depicted. The holder 10 may comprise a mechanism for positioning the movable contacts 8, 9 during a tap changer. Furthermore, the holder 10 may comprise the diverter switch or parts thereof.

During a tap change, one of the movable contacts 8, 9 carries out a rotational movement to connect to another one of the fixed contacts 4*a*, 4*b*, 5*a*, 5*b*. The movement is driven by a motor which may be positioned on top of the on-load tap changer 1. A rotation of a motor shaft may be transferred via an energy accumulation system and a Geneva wheel to the movable contacts 8, 9, for example.

The dynamic unit 7 may comprise sub-units which will not move during a tap change. As an example, a top plate 10 may be permanently fixed in an axial and rotational position relative to the static unit 2 after having assembled the static unit 2 and the dynamic unit 7. Also a bottom plate 12 may be permanently fixed to the static unit 2. The bottom plate 12 may be fixed to the dynamic unit 7 by bolt connections, for example. The bottom plate 12 may enhance the stability of the dynamic unit 7 when assembling the phase column to the static unit.

During assembly of the units 2, 7, care has to be taken that the fixed contacts 4*a*, 4*b*, 5*a*, 5*b* and the movable contacts 8, 9 are not damaged. In addition to that, a defined positioning and secure engagement of the fixed contacts 4*a*, 4*b*, 5*a*, 5*b*, and the movable contacts 8, 9 has to be established at the end of the assembly process.

For this aim, the on-load tap changer 1 comprises an axial blocking device 13 and a rotational positioning device 14. The axial blocking device 13 allows a movement of the dynamic unit 7 in a direction along a longitudinal axis A only at pre-defined rotational positions of the dynamic unit 7. The rotational positioning device 14 enables rotationally positioning the dynamic unit 7 relative to the static unit 2. Possible structures and functionalities of the devices 13, 14 are described in the following Figures.

Figure 2A:
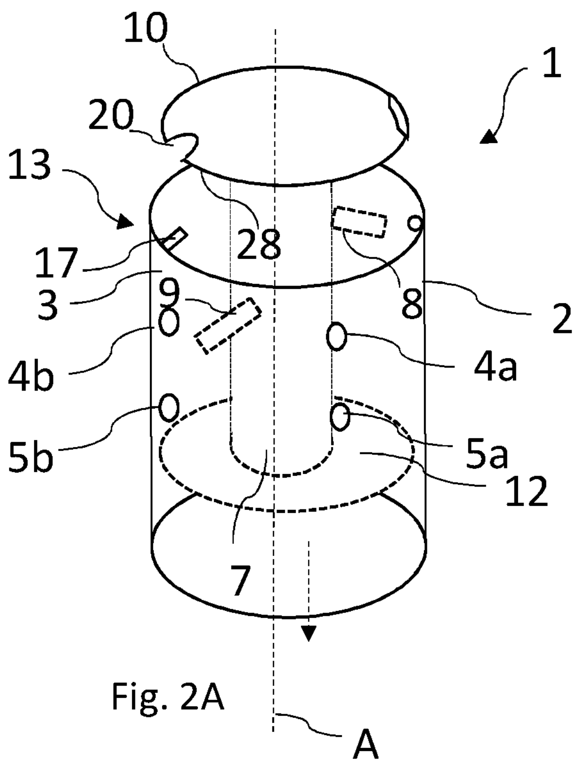
FIGS. 2A to 2D are schematic views of steps during assembly of an on-load tap changer according to an embodiment.
Figure 2B:
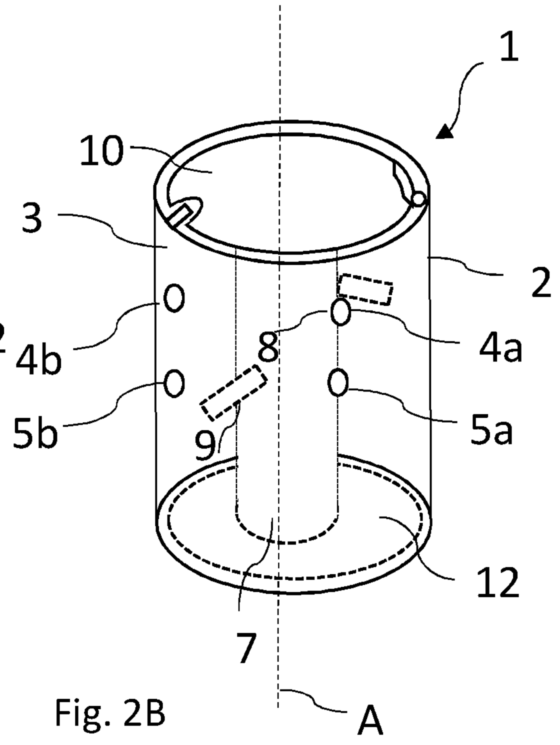

FIGS. 2A to 2B show steps in assembling the dynamic unit 7 and the static unit 2 of the on-load tap changer 1 of FIG. 1.

As shown in FIG. 2A, in a first step of the assembly process, the dynamic unit 7 is lowered into the static unit 2. In this step, the rotational position of the dynamic unit 7 relative to the static unit 2 is such that the movable contacts 8, 9 are located at different angular positions than the fixed contacts 4*a*, 4*b*, 5*a*, 5*b* in order to prevent an unwanted interaction and possible mechanical damage during assembly.

The rotational position during lowering the dynamic unit 7 can be defined by the axial blocking device 13 which prevents lowering the dynamic unit 7 within the static unit 2 in unwanted rotational positions. As an example, the axial blocking device 13 may comprise a stop member 17 interacting with a stop wall 28 in an unwanted rotational position and a slot 20 enabling the stop member 17 to pass in an allowed rotational position. The slot 20 may be provided in the dynamic unit 7, for example. As an example, the slot 20 may be provided in one of or both a top plate 10 or a bottom plate 12 of the dynamic unit 7. It is possible that the bottom plate 12 has a diameter small enough to enable passing the fixed contacts freely. It is also possible that the bottom plate 12 has a larger diameter and is provided with the slots 20.

FIG. 2B shows the units 2, 7 when the dynamic unit 7 has reached its final axial position relative to a longitudinal axis A of the tap changer 1.

Figure 3A:
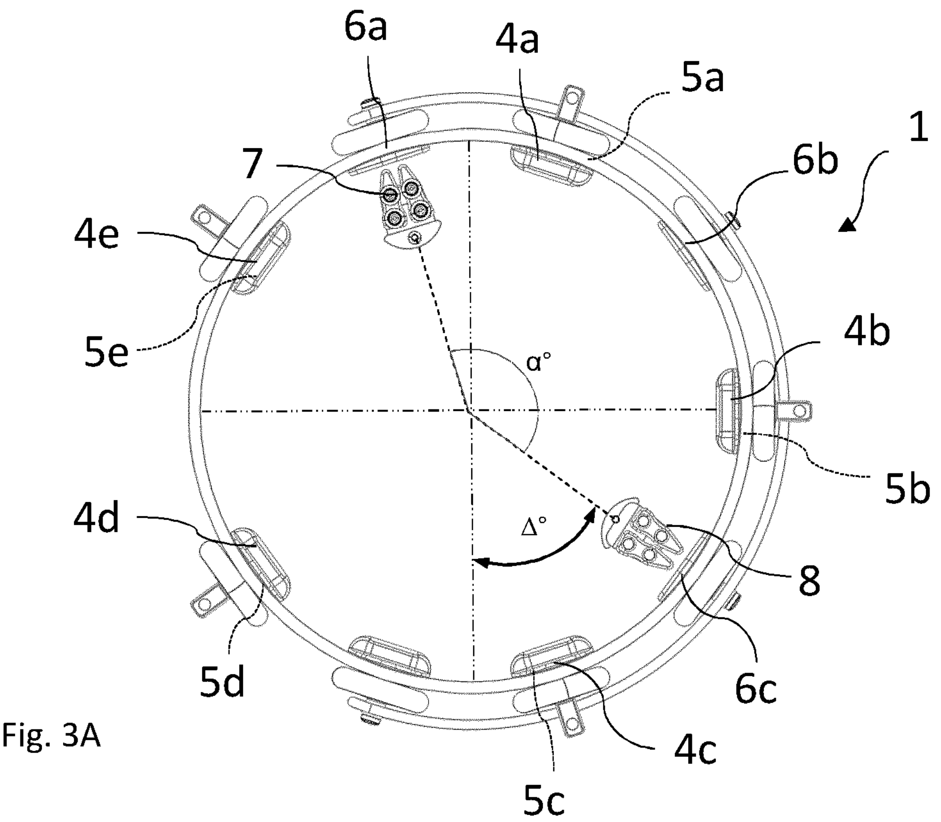
FIGS. 3A and 3B are cross sectional views of an on-load tap changer in two positions during assembly according to an embodiment.

FIG. 3A shows a cross sectional view of an on-load tap changer 1 in the position shown in FIG. 2B. In this position, the movable contacts 8, 9 are rotationally displaced from the fixed contacts 4*a*-4*e*, 5*a*-5*e*. For clarity reasons, some parts of the on-load tap changer 1 such as the holder 10 are not depicted in FIG. 3A.

The fixed contacts 4*a*-4*e* for interaction with the even movable contact 8 are positioned directly above the fixed contacts 5*a*-5*e* for the odd movable contact 9 so that the fixed contacts 5*a*-5*e* are not visible. It is also possible that the odd fixed contacts 5*a*-5*e* are positioned above the even fixed contacts 4*a*-4*e*.

In this state, the angular position of the movable contacts 8, 9 relative to parts which are permanently fixed during operation to the static unit 2, such as the top plate 11, is locked by an internal mechanism of the dynamic unit 7.

The even movable contact 8 and the odd movable contact 9 are positioned at a rotational distance of x. The even movable contact 8 is positioned between two even fixed contacts 4*e*, 4*a* which are rotationally adjacent to each other and the odd movable contact 9 is positioned between two odd fixed contacts 5*b*, 5*c* which are rotationally adjacent to each other. As an example, the contacts 8, 9 are positioned at the same angular positions as further short contacts 6*a* and 6*c*, respectively.

The short contacts 6*a*-6*c* are positioned at an axial position closer to the top of the tap changer 1 than the fixed contacts 4*a*-4*e*, 5*a*-5*e*. During assembly, the movable contacts 8 and 9 are aligned with short contacts 6*a*, 6*c* which protrude to a minor extent into the interior of the static unit 2 so that that the movable contacts 8, 9 can pass these short contacts 6*a*, 6*c* without any mechanical interaction.

Figure 2C:
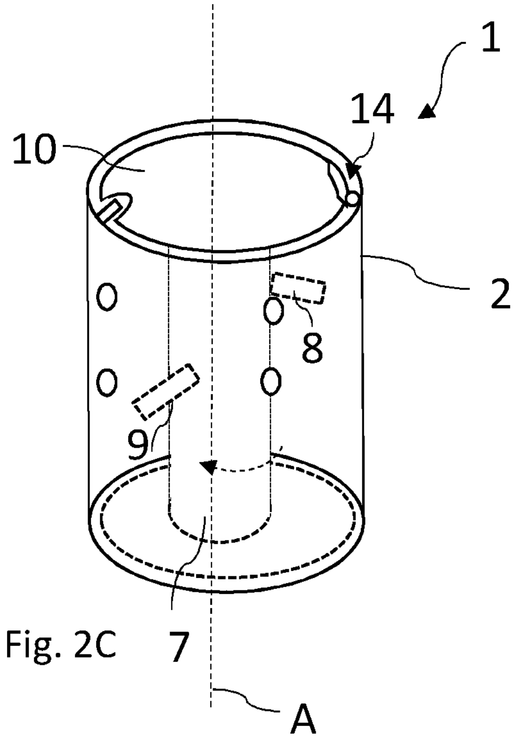

As shown in FIG. 2C, when the dynamic unit 7 has been brought into its final axial position, i.e., is entirely lowered in the container 3, the dynamic unit 7 is rotated to bring the movable contacts 8 and 9 into engagement with selected ones of the fixed contacts 4*a*, 4*b* and 5*a*, 5*b*. This rotation is achieved by actuating a rotational positioning device 14. The rotational positioning device 14 is provided for adjusting the rotational position of the dynamic unit 7 and, thereby, of the movable contacts 8, 9.

Figure 2D:
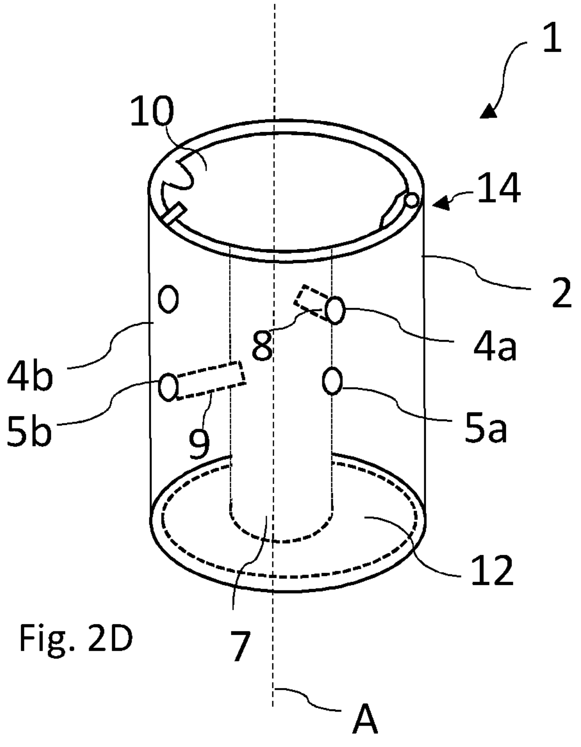

FIG. 2D shows the tap changer 1 in the final rotational position of the dynamic unit 7 after rotation, i.e., fully assembled and ready to be operated. The movable contacts 8 and 9 are engaged with respective fixed contacts 4*b*, 5*c*.

Figure 3B:
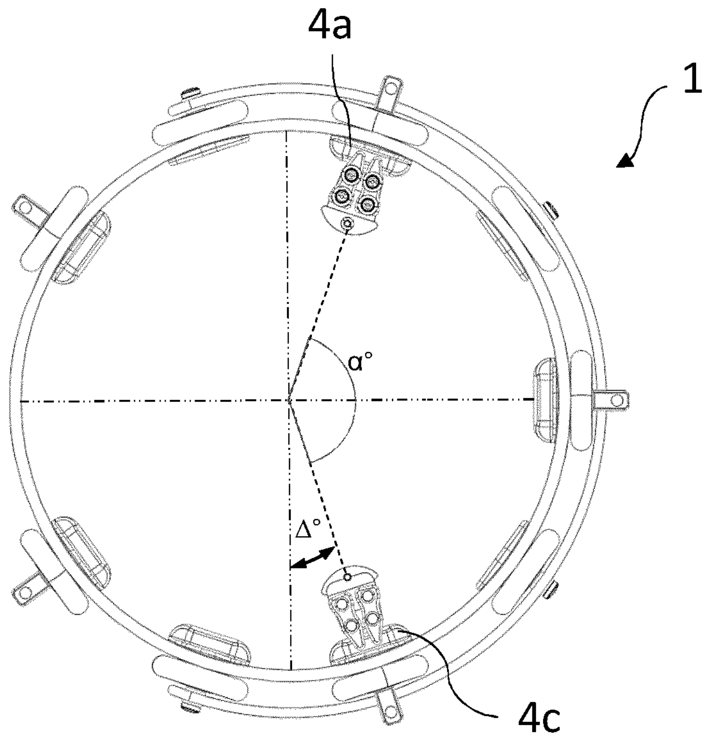

FIG. 3B shows in a cross-sectional view the position of the movable contacts 8, 9 in the fully-assembled state. In comparison to the start position shown in FIG. 3A, the contacts 8, 9 have been displaced by an angle 4 about the longitudinal axis A and relative to the static unit 2. The angular distance a between the contacts 8, 9 has been kept constant.

The shown positions of the movable contacts 8, 9 relates to electric connections to tap positions at the transfer winding connected with the respective fixed contacts 4*b*, 5*c*. During tap changes, one of the movable contacts 8, 9 is unlocked and selectively rotated to a different fixed contact 4*a*-4*e*, 5*a*-5*e*. The axial fixation of the dynamic unit 7 is provided automatically by the axial blocking device when the dynamic unit 7 has been rotated into its final position. This prevents axial displacement of the dynamic unit 7 when the movable contacts 8, 9 are engaged with the fixed contacts 4*a*-4*e*, 5*a*-5*e*. In addition to that, in the final rotational position, the upper flange 18 may be fixed to the top plate 10 by bolts, for example.

For disassembling the dynamic unit 7 from the static unit 2, the steps shown in FIGS. 2A to 2D are carried out in reversed order. Accordingly, in a first step, the rotational positioning device 14 is operated to disengage the movable contacts 8, 9 from the respective fixed contacts 4*a*-4*e* and 5*a*-5*e*. The disengagement may be enabled in every position of the movable contacts 8, 9. Thereby the axial blocking device releases the axial lock of the dynamic unit 7 such that the dynamic unit 7 can be extracted out of the static unit 2.

Figure 4A:
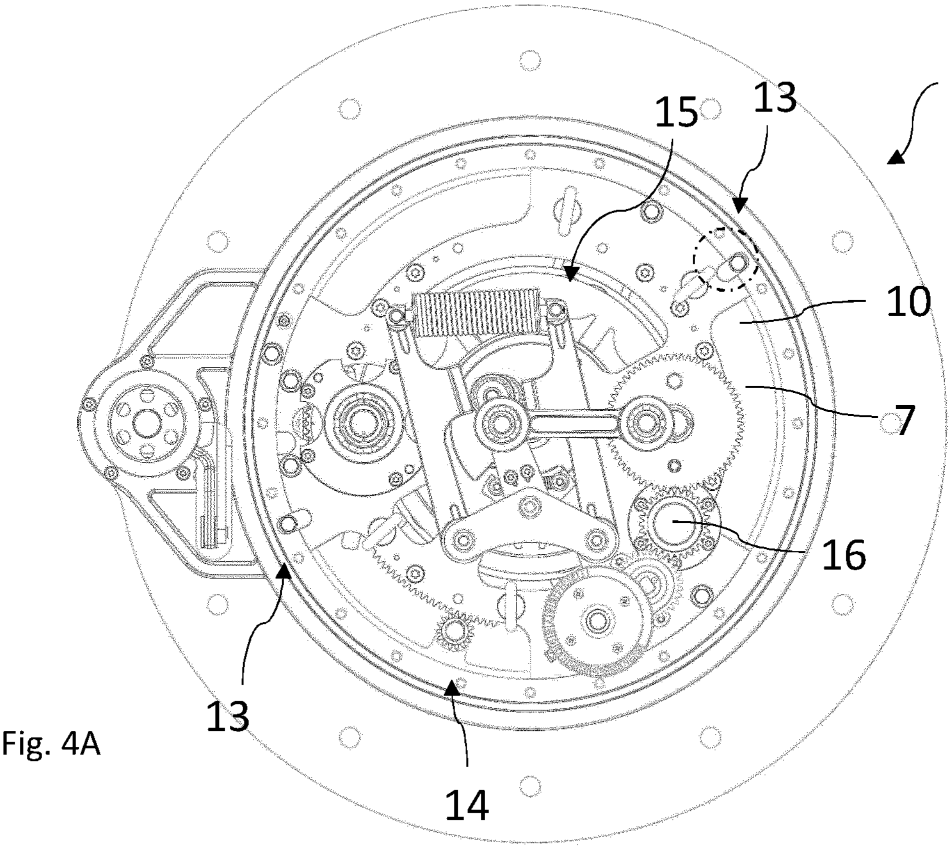
FIG. 4A is a cross sectional view of an on-load tap changer according to an embodiment.

FIG. 4A shows a cross sectional view at an upper part of an on-load tap changer 1 according to an embodiment. A detailed view of an axial blocking device 13 and a rotational positioning device 14 is shown in FIGS. 4B and 4C, respectively.

In the shown embodiment, both the axial blocking device 13 and the rotational positioning device 14 comprise an involvement of a top plate 10 of the dynamic unit 7. The top plate 10 may carry an energy accumulation device 15 which is driven by a shaft 16 connected to a motor of the on-load tap changer 1. The kinematic chain to the movable contacts may start from the shaft 16 and may comprise several gears. The energy accumulation device 15 accumulates and releases energy for coordinating the operations required for an on-load tap change. In further embodiments, another part of the dynamic unit 7 which is permanently fixed to the static unit 2 may be part of the blocking device 13 and/or the rotational positioning device 14. It is also possible that different parts of the dynamic unit 7 are involved in the blocking device 13 and the rotational positioning device 14.

It is also possible that the tap changer 1 comprises two or more blocking devices 13. In the depicted embodiment, two blocking devices 13 are provided, as can be seen in FIG. 4A.

Figure 4B:
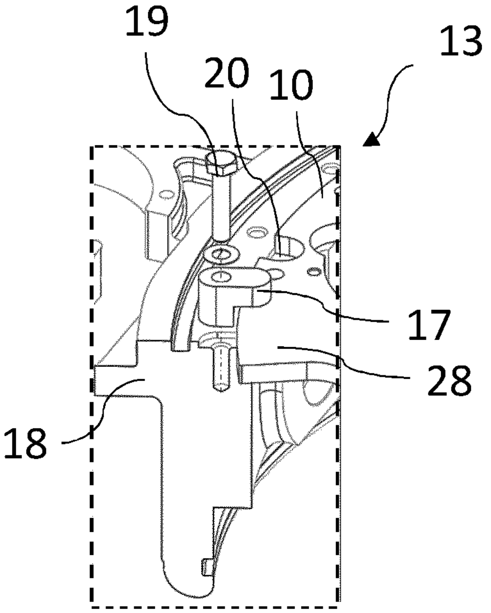
FIG. 4B is a perspective view of an axial blocking device of the embodiment shown in FIG. 4A.
Figure 4C:
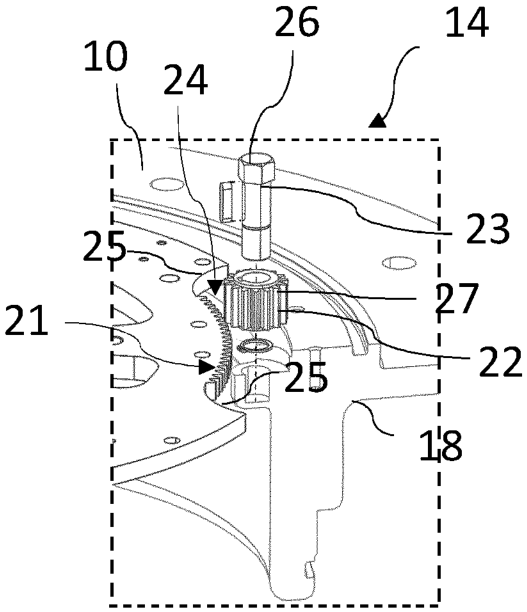
FIG. 4C is a perspective view of a rotational positioning device of the embodiment shown in FIG. 4A.

As can be seen in FIG. 4B, each of the blocking devices 13 comprises a stop member 17. In the shown embodiment, the stop member 17 comprises a protrusion extending from an upper flange 18 of the static unit 2 radially inwards. The stop member 17 is permanently fixed to the upper flange 18 and, thereby to the static unit 2 by a bolt 19. The upper flange 18 may be permanently fixed to the top of the container 3 shown in FIG. 1, for example. The stop member 17 may also be fixed to a different part of the static unit 2.

The stop member 17 interacts with a slot 20 in the top plate 10 of the dynamic unit 7. Only when the slot 20 is rotationally aligned with the stop member 17, the dynamic unit 7 can pass the stop member 17 in an axial direction. When the slot 20 is misaligned, the stop member 17 abuts the top plate 10 when the top plate 10 is moved axially downwards or upwards and, thus, blocks an axial movement of the dynamic unit 7. Accordingly, the top plate 10 provides a stop wall 28 for interaction with the stop member 17. Axially moving the dynamic unit 7 for assembling or disassembling the tap changer 1 is only enabled at a rotational position of the dynamic unit 7 relative to the static unit 2 as defined by an alignment of the slot 20 and the stop member 17.

In some embodiments, not only a top plate 10 of the dynamic unit 7 but also a bottom plate 12 of the dynamic unit 7 may comprise slots 20 interacting with the stop members 17. It is also possible that further stop members 17 are located near the bottom of the static unit 2 to interact with stop members 17 at a bottom plate 12 when the dynamic unit 7 has been lowered in the static unit 2. In further embodiments, the dynamic unit 7 may comprise one or more stop members 17 and the static unit 2 may comprise one or more slots 20.

As can be seen in FIG. 4C, the rotational positioning device 14 comprises an interaction of radially extending first teeth 21 of the top plate 10 interacting with second teeth 22 of a spur wheel 27. The spur wheel 27 is axially fixed to the upper flange 18 of the static unit 2 by a bolt 23. The bolt 23 is in splined engagement with the spur wheel 27 such that by rotating the bolt 23, the spur wheel 27 is rotated. By the engagement of the first teeth 21 of the top plate 10 with the second teeth of the spur wheel 27, the rotational movement of the spur wheel 27 results in a rotational movement of the plate 10 and, thereby, the entire dynamic unit 7.

The upper part of the bolt 23 may be an adjustment member 26 directly accessible and operable by a user during assembly and/or disassembly of the tap changer 1. The bolt 23 may be covered by a cover during operation of the tap changer 1.

The first teeth 21 of the top plate 10 extend only along a limited angular range along the top plate 10. The first teeth 21 are positioned in a recess 24 in the top plate 10. Both ends of the recess 24 are delimited by walls 25 which prevent a movement of the top plate 10 beyond the predefined angular range. The walls 25 may define a first and a second stop position.

In some embodiments, the rotational positioning device 14 is configured such that during assembly the adjustment member 26 is rotated until the first stop position is reached, wherein in the first stop position, the movable contacts 8, 9 are fully engaged with specific ones of the fixed contacts 4*a*-4*e* and 5*a*-5*e* as shown in FIG. 3B. The first stop position is established by a mechanical interaction of the spur wheel 27 with one of the walls 25 of the recess 24.

Furthermore, the rotational positioning device 14 may be configured such that during disassembly the adjustment member 26 is rotated until a second stop position is reached, wherein in the second stop position, the movable contacts are fully disengaged from the fixed contacts 4*a*-4*e* and 5*a*-5*e* as shown in FIG. 3A. In other embodiments, the correct rotational position of the dynamic unit 7 can be determined by visual inspection of the movable contacts 8, 9 and the fixed contacts 4*a*-4*e* and 5*a*-5*e*, for example. The second stop position is established by a mechanical interaction of the spur wheel 27 with another one of the walls 25 of the recess 24. In addition to that, in the second stop position, the one or more stop members 17 of the axial blocking device 13 may be aligned with the slots 20 such that lifting the dynamic unit 7 out of the static unit 2 is enabled.

REFERENCE SIGNS

1 on-load tap changer
2 static unit
3 cylindrical container
4*a*-4*e* fixed contacts (even)
5*a*-5*e* fixed contacts (odd)
6*a*-6*d* short contacts
7 dynamic unit
8 movable contact (even)
9 movable contact (odd)
10 top plate
11 holder
12 bottom plate
13 axial blocking device
14 rotational positioning device
15 energy accumulation device
16 shaft of motor
17 stop member
18 upper flange
19 bolt of axial blocking device
20 slot
21 first teeth of dynamic unit
22 second teeth of static unit
23 bolt of rotational positioning device
24 recess
25 wall
26 adjustment member
27 spur wheel
28 stop wall

The invention claimed is:

1. An on-load tap changer comprising:

a static unit comprising fixed contacts for connection to taps at a transformer winding, a dynamic unit comprising at least one movable contact for selectively contacting one of the fixed contacts during operation of the transformer, and comprising a rotational positioning device for adjusting the rotational position of the dynamic unit relative to the static unit during at least one of assembly or disassembly of the tap changer to engage or disengage the movable contacts to or from the fixed contacts, wherein the dynamic unit comprises first teeth and the static unit comprises a spur wheel comprising second teeth, the first teeth and the second teeth interacting with each other, wherein the rotational positioning device comprises an adjustment member operable by a user for rotating the spur wheel, wherein the rotational positioning device comprises a first stop position, in which further rotational adjustment in one rotational direction is prevented, wherein in the first stop position the movable contacts are fully engaged with the fixed contacts and wherein the rotational positioning device comprises a second stop position, in which further rotational adjustment in a second rotational direction is prevented, the second rotational direction being opposite to the first rotational direction, wherein in the second stop position the movable contacts are fully disengaged from the fixed contacts.

2. The on-load tap changer of claim 1, comprising at least one axial blocking device preventing at least one of assembling and disassembling the dynamic unit and the static unit unless the dynamic unit is in a pre-defined rotational position relative to the static unit.

3. The on-load tap changer of claim 2, wherein the at least one axial blocking device comprises a stop member and a stop surface, wherein an abutment of the stop member and the stop surface prevents an axial movement of the dynamic unit in at least one axial direction, and further comprises a slot, wherein at least one of assembly and disassembly is enabled when the stop member is aligned with the slot.

4. The on-load tap changer of claim 1, wherein the dynamic unit comprises a top plate located at a top of the dynamic unit, wherein the rotational positioning device comprises an interaction of the top plate with the static unit.

5. The on-load tap changer of claim 4, wherein the top plate carries an energy accumulating device for coordinating and driving operations during a tap change.

6. The on-load tap changer of claim 5, wherein the adjustment member comprises a bolt and wherein the spur wheel is in splined connection with the bolt.

7. A method for at least one of assembling and disassembling the on-load tap changer of claim 1, comprising the step of adjusting the relative rotational position of the dynamic unit and the static unit by actuating the rotational positioning device.

8. The method of claim 7, wherein assembling the on-load tap changer comprises positioning the dynamic unit within the static unit in a final axial position and, after that, actuating the rotational positioning device.

9. The method of claim 8, wherein disassembling the on-load tap changer comprises actuating the rotational positioning device and, after that, removing the dynamic unit from the static unit by axially displacing the dynamic unit.

10. The method of claim 7, wherein at least one of assembling and disassembling the on-load tap changer comprises the step of actuating the rotational positioning device until a stop position is reached.

11. The method of claim 10, wherein in the assembly process the stop position is a position in which the movable contacts are fully engaged with the fixed contacts and in the disassembly process the movable contacts are fully disengaged from the fixed contacts.

* * * * *